US009514542B2

(12) United States Patent
Matsumoto et al.

(10) Patent No.: US 9,514,542 B2
(45) Date of Patent: Dec. 6, 2016

(54) MOVING OBJECT TRACKING DEVICE, MOVING OBJECT TRACKING SYSTEM AND MOVING OBJECT TRACKING METHOD

(71) Applicant: PANASONIC CORPORATION, Osaka (JP)

(72) Inventors: Yuichi Matsumoto, Kanagawa (JP); Hiroaki Yoshio, Kanagawa (JP); Youichi Gouda, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 5 days.

(21) Appl. No.: 14/496,055

(22) Filed: Sep. 25, 2014

(65) Prior Publication Data
US 2015/0091944 A1 Apr. 2, 2015

(30) Foreign Application Priority Data

Sep. 27, 2013 (JP) ................................. 2013-201012

(51) Int. Cl.
G06T 7/20 (2006.01)
G06K 9/00 (2006.01)
G06T 11/60 (2006.01)

(52) U.S. Cl.
CPC ............ *G06T 7/20* (2013.01); *G06K 9/00771* (2013.01); *G06T 7/208* (2013.01); *G06T 11/60* (2013.01);
(Continued)

(58) Field of Classification Search
None
See application file for complete search history.

(56) References Cited

U.S. PATENT DOCUMENTS 7,957,565 B1 * 6/2011 Sharma .............. G06K 9/00778
382/103
8,891,821 B2 11/2014 Sato
(Continued)

FOREIGN PATENT DOCUMENTS

JP 2011-243155 12/2011
WO 2006/012645 2/2006

OTHER PUBLICATIONS

U.S. Appl. No. 14/326,690, to Sonoko Hirasawa et al, filed Jul. 9, 2014.
(Continued)

Primary Examiner — Chante Harrison
(74) Attorney, Agent, or Firm — Greenblum & Bernstein, P.L.C.

(57) ABSTRACT

A moving object tracking device for allowing a display device to display a movement line of a moving object superimposed on a real-time image of a monitored area includes: a detection unit that detects a moving object from images of the monitored area and outputs detection position information; a first movement line generation unit that removes erroneous detection information included in the detection position information and generates a determined movement line using the detection position information having the erroneous detection information removed; a second movement line generation unit that generates a provisional movement line interpolating an undetermined section between a substantially latest detection position indicated by the detection position information and an end point of the determined movement line; and a movement line information obtaining unit that obtains movement line information relating to an integrated movement line formed of the determined movement line and the provisional movement line integrated together.

9 Claims, 12 Drawing Sheets

(52) U.S. Cl.
CPC ............... *G06T 2207/10016* (2013.01); *G06T 2207/20221* (2013.01); *G06T 2207/30196* (2013.01); *G06T 2207/30232* (2013.01); *G06T 2207/30241* (2013.01)

(56) References Cited

U.S. PATENT DOCUMENTS

| | | | |
|---|---|---|---|
| 2002/0003540 A1* | 1/2002 | Unuma | G01S 13/288 345/474 |
| 2003/0179294 A1 | 9/2003 | Martins | |
| 2010/0134499 A1* | 6/2010 | Wang | G06T 13/80 345/473 |
| 2011/0199461 A1 | 8/2011 | Horio et al. | |
| 2013/0022246 A1 | 1/2013 | Tayama et al. | |
| 2013/0027561 A1 | 1/2013 | Lee et al. | |
| 2013/0030875 A1 | 1/2013 | Lee et al. | |
| 2013/0035916 A1* | 2/2013 | Girard | G06T 19/20 703/6 |
| 2013/0120405 A1* | 5/2013 | Maloney | G06T 13/00 345/474 |
| 2013/0278774 A1 | 10/2013 | Fujimatsu et al. | |
| 2014/0037147 A1 | 2/2014 | Yoshio et al. | |
| 2014/0267186 A1* | 9/2014 | Kreek | G06F 3/03545 345/179 |
| 2014/0362215 A1 | 12/2014 | Yoshio et al. | |
| 2015/0066448 A1* | 3/2015 | Liu | G06T 7/20 703/2 |
| 2015/0178972 A1* | 6/2015 | Barcay | G06T 17/05 345/419 |

OTHER PUBLICATIONS

U.S. Appl. No. 14/326,683, to Takeshi Fujimatsu et al., filed Jul. 9, 2014.
U.S. Appl. No. 14/326,510, to Takeshi Fujimatsu et al., filed Jul. 9, 2014.
U.S. Appl. No. 14/496,051, to Yuichi Matsumoto et al., filed Sep. 25, 2014.
U.S. Appl. No. 14/520,769, to Youichi Gouda et al., filed Oct. 22, 2014.
U.S. Appl. No. 14/381,657, to Yuichi Matsumoto et al., filed Aug. 28, 2014.
Xinguo Yu et al., "Trajectory-Based Ball Detection and Tracking in Broadcast Soccer Video", IEEE Transactions on Multimedia, IEEE Service Center, Piscataway, NJ, US, vol. 8, No. 6, XP011150532, Dec. 1, 2006, pp. 1164-1178.
Search report from E.P.O., mail date is Feb. 20, 2015.

* cited by examiner

Fig.3
——— determined movement line
······· undetermined movement line
(A)
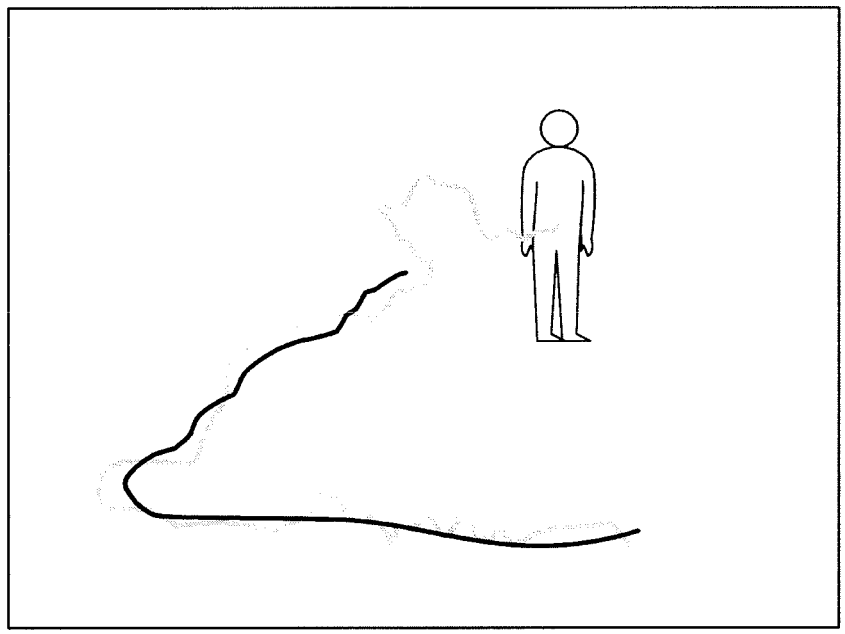
(B)
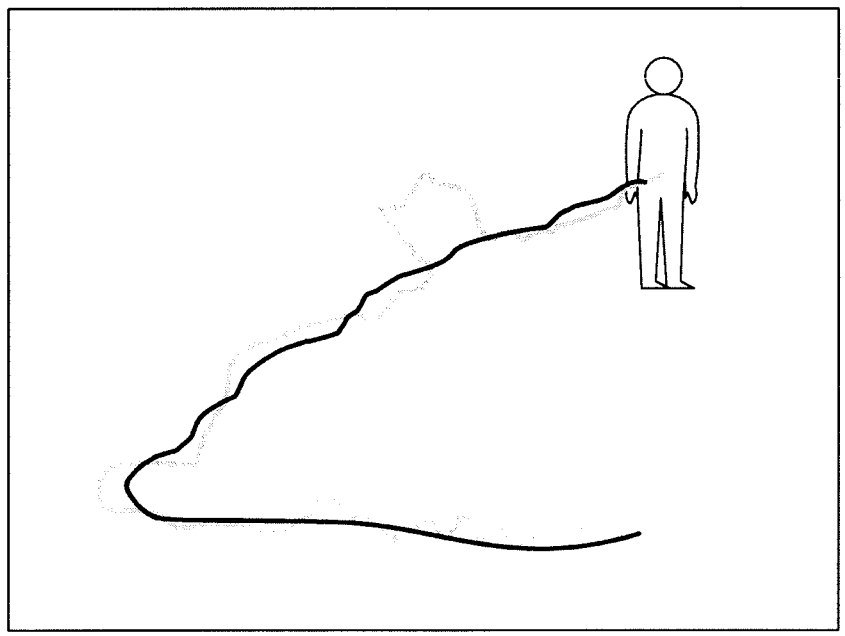

Fig.5
——— determined movement line
------- undetermined movement line
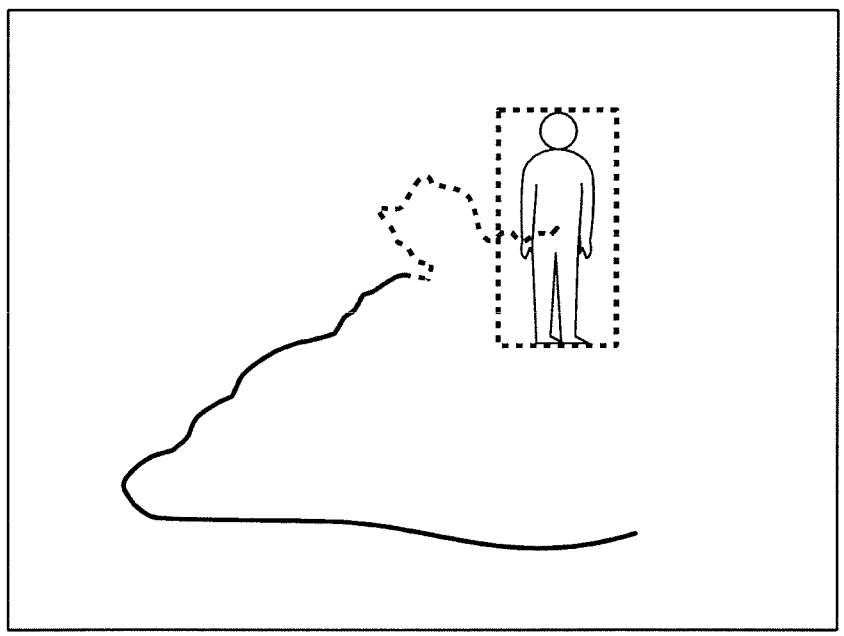
(A)
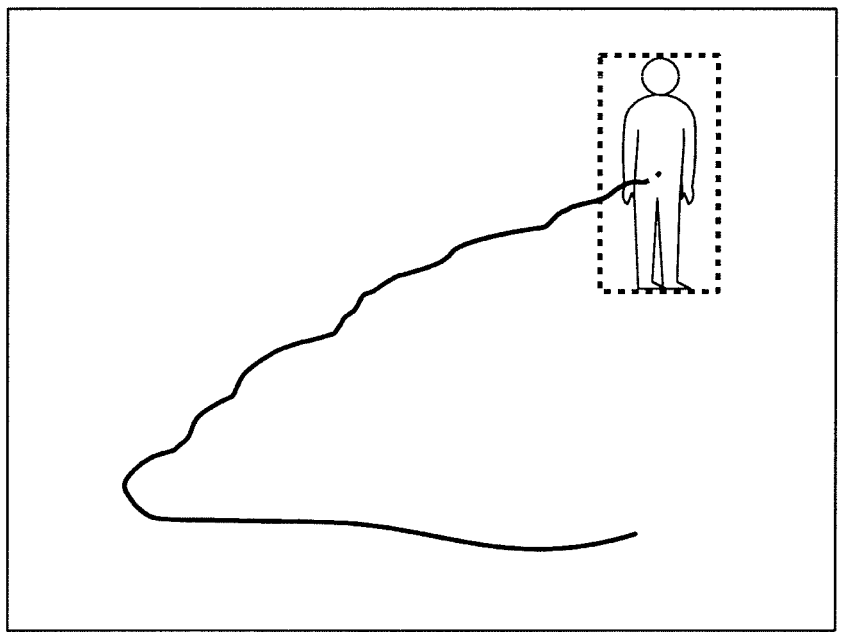
(B)

MOVING OBJECT TRACKING DEVICE, MOVING OBJECT TRACKING SYSTEM AND MOVING OBJECT TRACKING METHOD

TECHNICAL FIELD

The present invention relates to a moving object tracking device, a moving object tracking system and a moving object tracking method for, to allow a display device to display a screen in which a movement line of a moving object is superimposed on the real-time image of a monitored area, obtaining movement line information based on detection position information obtained by detecting the moving object from images of the monitored area.

BACKGROUND OF THE INVENTION

Monitoring systems that include a monitor for displaying video image of a monitored area to monitor a moving object(s) such as persons included in the image are widely used. Further, it is known to detect a moving object from the image and, based on the detection position information obtained thereby, generate a movement line (movement trajectory) representing the movement path of the moving object (see JP2011-243155A). If the movement line is displayed superimposed on the real-time image by use of such movement line generation technology, it is possible to grasp the moving state of the moving object properly by viewing the displayed movement line together with the moving object included in the image, and thus, the efficiency of the monitoring work can be improved.

In a case where a movement line of a moving object is displayed superimposed on the real-time image as described above, if the movement line is formed by merely connecting the detection positions in chronological order, the movement line may significantly depart from the actual movement path of the moving object because the detection positions may include "noise" caused by an error in the moving object detection process. Therefore, it is desirable to remove the noise caused by an error in the moving object detection process and generate a determined movement line optimized as the movement path of the moving object based on the detection positions having the noise removed.

However, it takes time to perform the process of generating the determined movement line, and this may cause the movement line to be displayed with a significant delay relative to the movement of the moving object (such as a person). In such a case, there is a problem that the movement path is not displayed to closely follow the moving object and thus a user may feel a sense of incongruity. Further, in the case where the movement line is not drawn to closely follow the moving object, it becomes difficult to properly grasp the moving state of the moving object, creating a problem that the efficiency of the monitoring work is decreased.

SUMMARY OF THE INVENTION

The present invention is made to solve the aforementioned problems in the prior art, and a primary object of the present invention is to provide a moving object tracking device, a moving object tracking system and a moving object tracking method configured to, when a movement line of a moving object is displayed superimposed on the real-time image of a monitored area, prevent the displayed movement line from causing a user to feel a sense of incongruity and allow the user to properly grasp the moving state of the moving object.

To achieve the foregoing object, a first aspect of the present invention provides a moving object tracking device for, to allow a display device to display a screen in which a movement line indicating a movement path of a moving object is superimposed on a real-time image of a monitored area, obtaining movement line information based on detection position information obtained by detecting the moving object from images of the monitored area, including: a moving object detection unit that detects the moving object from the images of the monitored area and outputs the detection position information of the moving object; a first movement line generation unit that removes erroneous detection information included in the detection position information and generates a determined movement line optimized as the movement path of the moving object based on the detection position information having the erroneous detection information removed; a second movement line generation unit that generates a provisional movement line interpolating an undetermined section between a substantially latest detection position indicated by the detection position information and an end point of the determined movement line; and a movement line information obtaining unit that obtains movement line information relating to an integrated movement line formed of the determined movement line and the provisional movement line integrated together.

According to this structure, regardless of the state of the process of generating the determined movement line, the integrated movement line formed of the determined movement line and the provisional movement line integrated together is displayed to extend to the vicinity of the moving object shown in the displayed image. Thereby, the movement line is always displayed to follow the moving object, and therefore, it is possible to avoid causing the user to feel a sense of incongruity and allow the user to grasp the moving state of the moving object properly, thereby improving the efficiency of the monitoring work.

In a second aspect of the present invention, the second movement line generation unit generates, as the provisional movement line, an undetermined movement line connecting the detection positions indicated by the detection position information in chronological order.

According to this structure, since the undetermined movement line includes the noise due to erroneous detection made in the moving object detection process, the undetermined movement line may deviate from the actual movement path of the moving object, but the undetermined movement line substantially matches the actual movement path of the person, and thus, significantly contributes to grasping the moving state of the moving object properly.

In a third aspect of the present invention, when the moving object detection unit detects multiple moving objects from the images, the movement line information obtaining unit obtains the movement line information for each of the moving objects.

According to this structure, even when there are multiple moving objects detected, the movement line is displayed for each moving object, whereby it is possible to grasp the moving state of each moving object. Particularly, since the movement line is displayed to extend to the latest detection position of each moving object, it is possible to avoid associating each movement line with a wrong moving object. This also contributes to grasping the moving state of each moving object correctly.

In a forth aspect of the present invention, the movement line information includes display information for displaying the determined movement line and the provisional movement line to be distinguishable from each other.

According to this structure, the determined movement line and the provisional movement line are displayed to be distinguishable from each other, and thus, it is possible to distinguish the determined movement line and the provisional movement line from each other visually. Particularly, when the provisional movement line is embodied by the undetermined movement line, distinguishing between the determined movement line and the undetermined movement line allows the user to grasp the situation in which the movement line is determined.

In a fifth aspect of the present invention, the determined movement line and the provisional movement line are drawn with lines which are different from each other in at least one of line type, thickness, darkness and color.

According to this structure, the determined movement line and the provisional movement line can be visually distinguished from each other easily.

In a sixth aspect of the present invention, one of the determined movement line and the provisional movement line is drawn with a solid line and the other is drawn with a broken line.

According to this structure, the determined movement line and the provisional movement line can be visually distinguished from each other even more easily.

In a seventh aspect of the present invention, animation display is performed on at least one of the determined movement line and the provisional movement line to changes a state of display of the line periodically.

According to this structure, the determined movement line and the undetermined movement line can be displayed so as to be distinguishable from each other. It is possible to perform the animation display on each of the determined movement line and the provisional movement line. In such a case, different animation display should be performed for the determined movement line and the provisional movement line.

In an eighth aspect of the present invention, the moving object tracking device further includes a display method setting unit that, in accordance with an input operation performed by a user to designate a display method of the determined movement line and the provisional movement line, sets a display method to that designated by the user, wherein the display information is generated in accordance with the display method set by the display method setting unit.

According to this structure, the display method of the determined movement line and the provisional movement line can be designated by a user as necessary, and thus, the user convenience is improved.

In a ninth aspect of the present invention, there is provided a moving object tracking system for, to allow a display device to display a screen in which a movement line indicating a movement path of a moving object is superimposed on a real-time image of a monitored area, obtaining movement line information based on detection position information obtained by detecting the moving object from images of the monitored area, including: a camera that captures images of the monitored area; a plurality of information processing devices; and the display device that displays a screen in which the movement line is superimposed on the real-time image of the monitored area, wherein the plurality of information processing devices jointly include: a moving object detection unit that detects the moving object from the images of the monitored area and outputs the detection position information of the moving object; a first movement line generation unit that removes erroneous detection information included in the detection position information and generates a determined movement line optimized as the movement path of the moving object based on the detection position information having the erroneous detection information removed; a second movement line generation unit that generates a provisional movement line interpolating an undetermined section between a substantially latest detection position indicated by the detection position information and an end point of the determined movement line; a movement line information obtaining unit that obtains movement line information relating to an integrated movement line formed of the determined movement line and the provisional movement line integrated together; and a screen generation unit that generates, based on the movement line information, the screen in which the movement line is superimposed on the real-time image of the monitored area.

According to this structure, when a movement line of a moving object is displayed superimposed on the real-time image of a monitored area, it is possible to prevent the displayed movement line from causing a user to feel a sense of incongruity and allow the user to properly grasp the moving state of the moving object, as in the first aspect of the present invention.

In a tenth aspect of the present invention, there is provided a moving object tracking method for, to allow a display device to display a screen in which a movement line indicating a movement path of a moving object is superimposed on a real-time image of a monitored area, obtaining movement line information based on detection position information obtained by detecting the moving object from images of the monitored area, including: detecting the moving object from the images of the monitored area and outputting the detection position information of the moving object; removing erroneous detection information included in the detection position information and generating a determined movement line optimized as the movement path of the moving object based on the detection position information having the erroneous detection information removed; generating a provisional movement line interpolating an undetermined section between a substantially latest detection position indicated by the detection position information and an end point of the determined movement line; and obtaining movement line information relating to an integrated movement line formed of the determined movement line and the provisional movement line integrated together.

According to this structure, when a movement line of a moving object is displayed superimposed on the real-time image of a monitored area, it is possible to prevent the displayed movement line from causing a user to feel a sense of incongruity and allow the user to properly grasp the moving state of the moving object, as in the first aspect of the present invention.

BRIEF DESCRIPTION OF THE DRAWINGS

Now the present invention is described in the following in terms of preferred embodiments thereof with reference to the appended drawings, in which:

FIGS. 3A and 3B are explanatory diagrams for explaining a state of a determined movement line and an undetermined movement line generated by a determined movement line generation unit 23 and a provisional movement line generation unit 24, respectively;

FIGS. 5A and 5B are explanatory diagrams showing a movement line shown in the screen displayed on the monitor 7 in the embodiment of the present invention;

FIGS. 12A, 12B, 12C-1 and 12C-2 are explanatory diagrams for explaining states of display of movement lines in a case where multiple persons are detected.

DETAILED DESCRIPTION OF THE PREFERRED EMBODIMENTS

In the following, embodiments of the present invention will be described with reference to the drawings.

Figure 1:
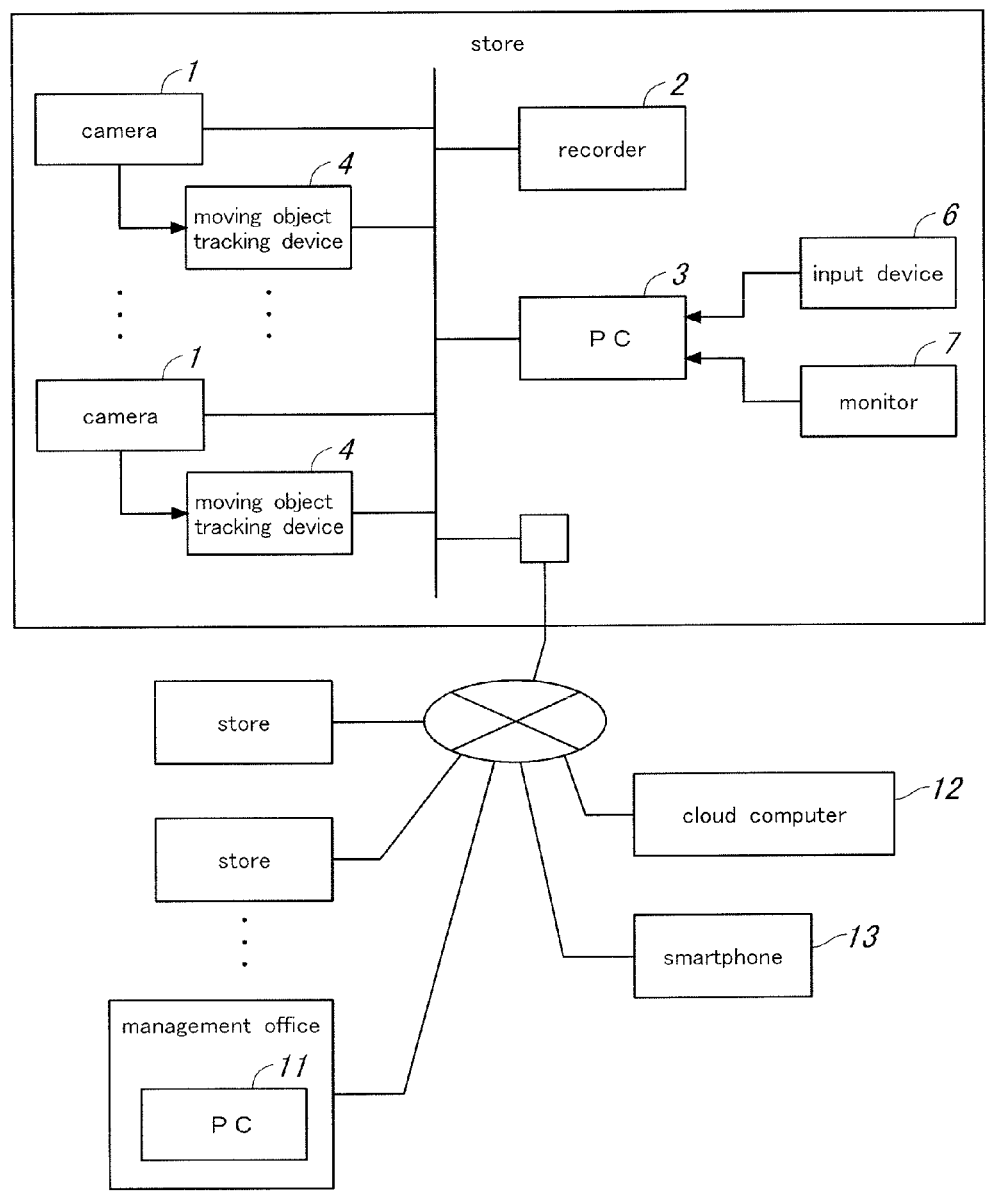
FIG. 1 is a diagram showing an overall configuration of a moving object tracking system according to an embodiment of the present invention.

FIG. 1 is a diagram showing an overall configuration of a moving object tracking system according to an embodiment of the present invention. This moving object tracking system is designed for retail stores such as a supermarket or the like, and includes cameras 1, a recorder (image storing device) 2, a personal computer (PC) 3 and moving object tracking devices 4.

The cameras 1 are mounted at appropriate positions in a store to capture images of a monitored area in the store, and image information obtained thereby is recorded in the recorder 2.

The PC 3 is connected with an input device 6 such as a mouse for a user such as a monitoring person to perform a variety of input operations, and a monitor (display device) 7 on which a monitoring screen is displayed. It is to be noted that the input device 6 and the monitor 7 may be embodied as a touch panel display.

The PC 3 is set up in a security station or the like of the store, and causes the monitor 7 to display a monitoring screen which enables the monitoring person (such as a security guard) to view the real-time image of an interior of the store taken by the cameras 1 or the past image of the interior of the store recorded in the recorder 2.

A PC 11 installed in a management office is also connected with a monitor not shown in the drawings, such that a user at the management office can check the situation in the store by viewing the real-time image of the interior of the store taken by the cameras 1 or the past image of the interior of the store recorded in the recorder 2.

Figure 2:
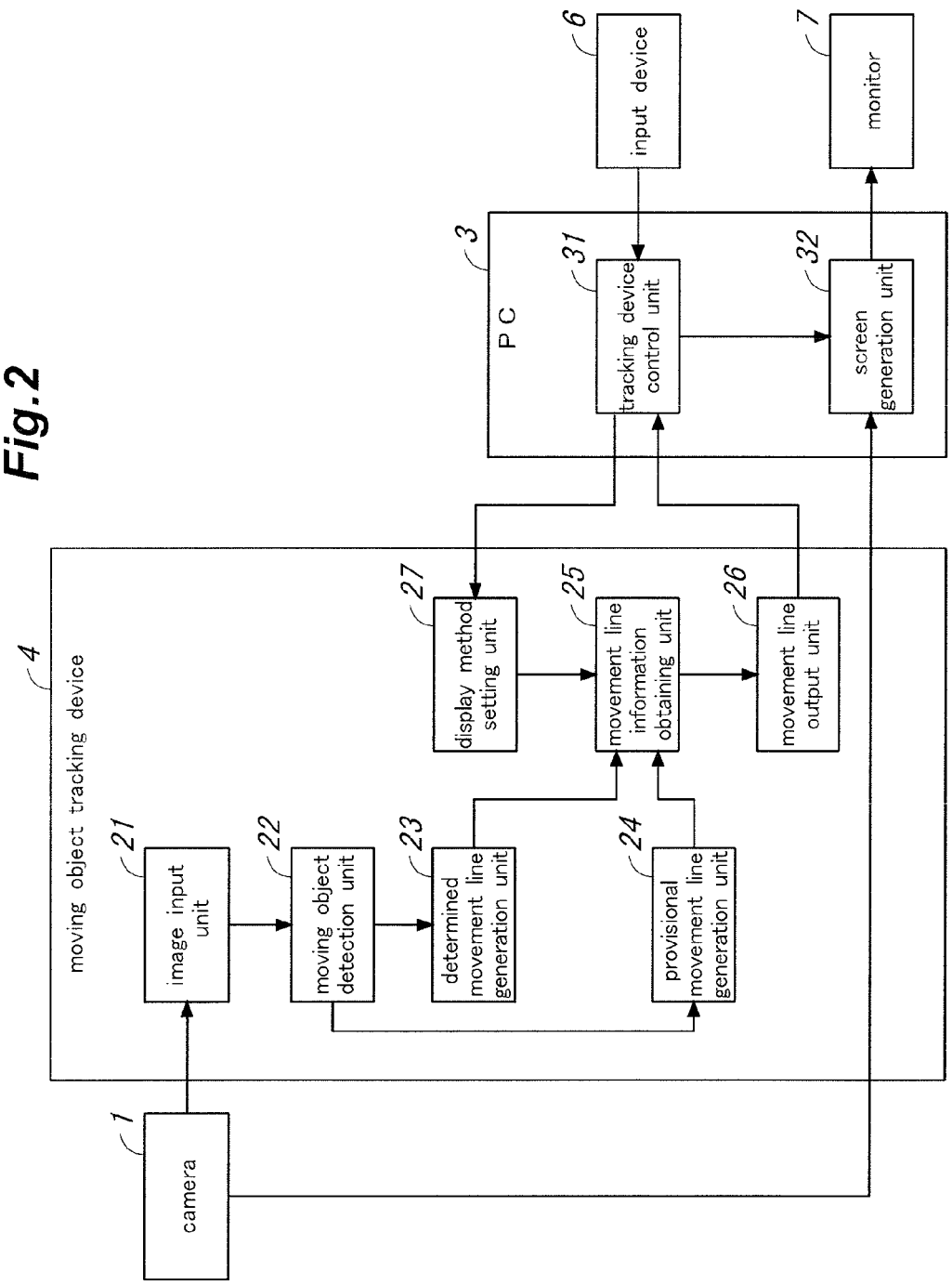
FIG. 2 is a block diagram schematically showing a functional structure of a moving object tracking device 4 and a personal computer (PC) 3.

Next, a description will be given of a moving object tracking process performed by each moving object tracking device 4 shown in FIG. 1. FIG. 2 is a block diagram schematically showing a functional structure of the moving object tracking device 4 and the PC 3. It is to be noted that FIG. 2 shows only one camera 1 and one moving object tracking device 4 for the sake of simplicity, though the system may include multiple cameras 1 and moving object tracking devices 4, as shown in FIG. 1.

The moving object tracking device 4 includes an image input unit 21, a moving object detection unit 22, a determined movement line generation unit (first movement line generation unit) 23, a provisional movement line generation unit (second movement line generation unit) 24, a movement line information obtaining unit 25, a movement line output unit 26, and a display method setting unit 27. The PC 3 includes a tracking device control unit 31 and a screen generation unit 32.

The image input unit 21 of the moving object tracking device 4 receives images (frames) output from the camera 1. The moving object detection unit 22 performs a process of detecting a person(s) (moving object) from the images input into the image input unit 21 and outputting detection position information for each person. This moving object detection process may be performed by use of known image recognition technology (person detection technology, person tracking technology, etc.).

The determined movement line generation unit 23 performs a process of removing erroneous detection information (such as noise) included in the detection position information (such as the position coordinates of the person) obtained by the moving object detection unit 22 and obtaining a determined movement line optimized as the movement path of the person based on the detection position information having the erroneous detection information removed. In this determined movement line generation process, data cleansing is performed on the detection position information by use of an appropriate smoothing algorithm.

The provisional movement line generation unit 24 performs a process of generating a provisional movement line that interpolates the movement line in the undetermined section between the latest detection position obtained by the moving object detection unit 22 and the end point of the determined movement line generated by the determined movement line generation unit 23. Specifically, in the present embodiment, the provisional movement line generation unit 24 generates, as the provisional movement line, an undetermined movement line that is formed by connecting, in chronological order, the detection positions in the undetermined section indicated by the detection position information obtained by the moving object detection unit 22.

The movement line information obtaining unit 25 performs a process of obtaining movement line information relating to an integrated movement line formed by integrating the determined movement line and the provisional movement line. The movement line information obtained by the movement line information obtaining unit 25 is output from the movement line output unit 26.

The tracking device control unit 31 of the PC 3 performs a process of controlling the moving object tracking device 4 in accordance with input operations performed by a user using the input device 6, such as setting the conditions relating to various processes performed by the moving object tracking device 4.

Particularly, in the present embodiment, settings relating to the method of displaying the movement line for displaying the determined movement line and the provisional movement line so as to be distinguished from each other are made by the display method setting unit 27 of the moving object tracking device 4 controlled by the tracking device control unit 31 of the PC 3. Namely, when an operation for designating the display method of the movement line is performed by the user using the input device 6 of the PC 3, a process of setting the display method to that designated by the user's input operation is performed by the display method setting unit 27. Then, the movement line information obtaining unit 25 performs a process of generating display information for displaying the determined movement line and the provisional movement line to be distinguished from each other in accordance with the display method set by the display method setting unit 27. This display information is included in the movement line information and output from the movement line output unit 26.

The screen generation unit 32 performs a process of generating a monitoring screen to be displayed on the monitor 7. Specifically, in the present embodiment, the screen generation unit 32 generates, based on the movement line information obtained from the moving object tracking device 4 and the image information from the camera 1, a screen in which the movement line of a person is superimposed on the real-time image. Particularly, based on the display information contained in the movement line information, the determined movement line and the provisional movement line are displayed so as to be distinguishable from each other.

It is to be noted that the various units of the PC 3 shown in FIG. 2 are realized by executing programs for moving object tracking by the CPU of the PC 3. These programs may be installed in the PC 3 as specifically designed application programs. It is also possible to provide the moving object tracking device 4 with a Web server function and have the PC 3 run a general-purpose Web browser to achieve necessary functions.

Figure 4:
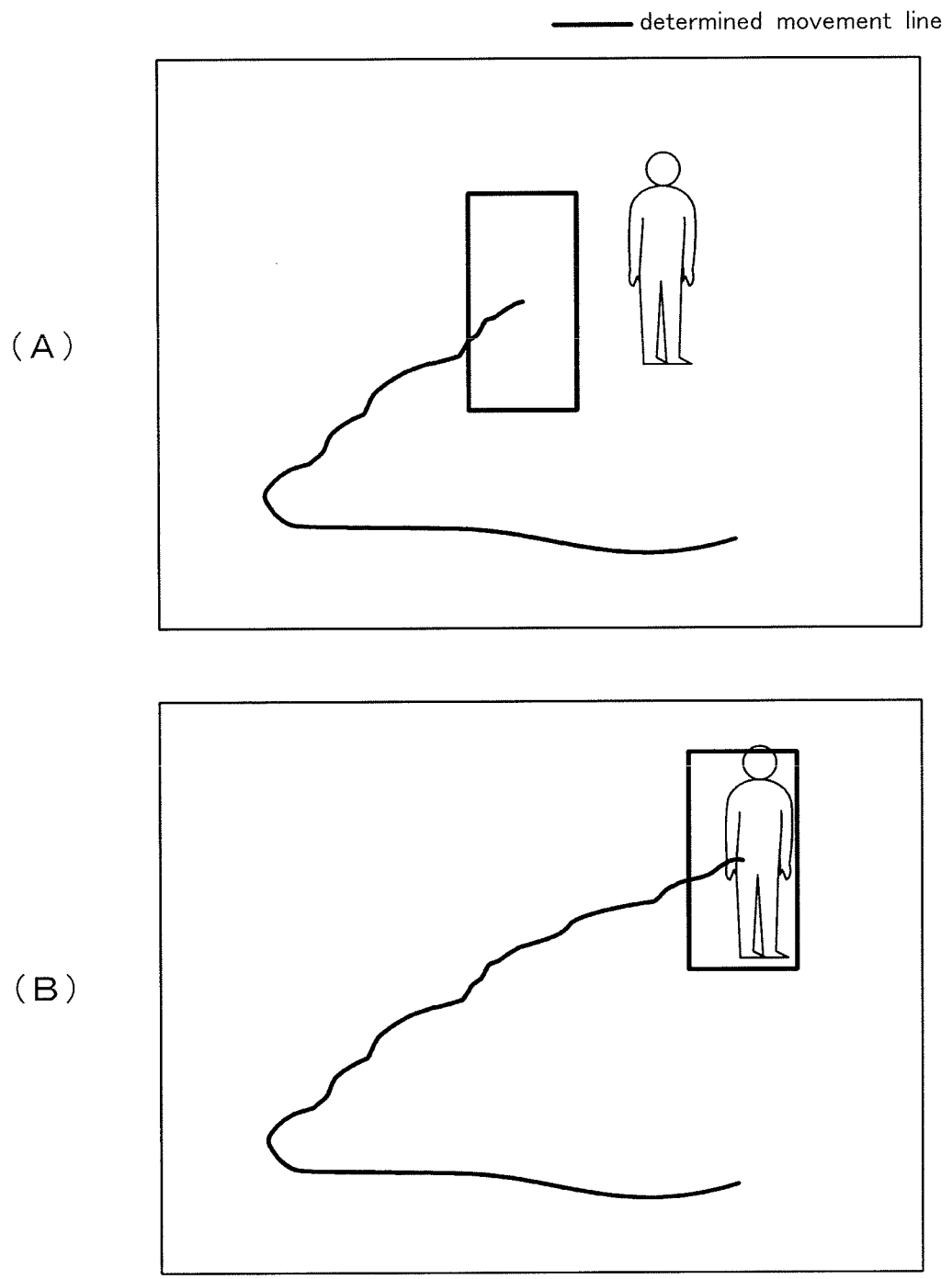
FIGS. 4A and 4B are explanatory diagrams showing a movement line shown in a screen displayed on a monitor 7 in a comparative example.

Next, a description will be given of the processes performed by the determined movement line generation unit 23, the provisional movement line generation unit 24 and the movement line information obtaining unit 25 of the moving object tracking device 4 shown in FIG. 2. FIG. 3 is an explanatory diagram for explaining a state of the determined movement line and the undetermined movement line generated by the determined movement line generation unit 23 and the provisional movement line generation unit 24, respectively. FIG. 4 is an explanatory diagram showing a movement line shown in the screen displayed on the monitor 7 in a comparative example. FIG. 5 is an explanatory diagram showing a movement line shown in the screen displayed on the monitor 7 in the present embodiment. In FIG. 4 and FIG. 5, a frame image indicating the position of a person is displayed to surround the person.

As shown in FIG. 3, the determined movement line generation unit 23 generates a determined movement line. In a state where the degree of reliability of the detection positions detected by the moving object detection unit 22 is low, it takes time to perform the determined movement line generation process, and thus, the determined movement line is generated with a significant delay relative to the movement of the person, as shown in part (A) in FIG. 3. When detection positions with a high degree of reliability become available, the determined movement line catches up with the movement of the person, such that the determined movement line extends to the vicinity of the person in the display image, as shown in part (B) in FIG. 3. It is to be noted that though an explanation was made in the foregoing that the delay in the determined movement line generation process can be attributed to a low degree of reliability of the detection positions, in general the delay is affected by the processing load of the smoothing algorithm. For instance, if the smoothing algorithm is designed to determine the current detection position by taking into account a certain range of past (earlier) and future (later) detection position information, generation (update) of the determined movement line is delayed by a time period required to process the earlier and later detection position information. Further, in such an algorithm, generation (update) of the determined movement line is delayed by a time period for obtaining the later frames (later detection position information).

If the determined movement line is displayed superimposed on the real-time image, in the state shown in part (A) in FIG. 3, the determined movement line is displayed considerably apart from the person shown in the displayed image, as shown in part (A) in FIG. 4, and though the person is moving, the movement line is not updated to follow the person. Then, when the state shown in part (B) in FIG. 3 is encountered, the determined movement line is updated all at once to extend to the vicinity of the latest detected position of the person as shown in part (B) in FIG. 4. Thus, when the determined movement line is simply displayed, the movement line is not drawn to closely follow the person while the person is moving, and this causes the user to feel a sense of incongruity. Further, this also makes it difficult to properly grasp the moving state of the person, thereby reducing the efficiency of the monitoring work.

In contrast, in the present embodiment, the provisional movement line generation unit 24 generates, as a provisional movement line that interpolates an undetermined section between the latest detection position obtained by the moving object detection unit 22 and the end point of the determined movement line, an undetermined movement line formed by connecting the detection positions indicated by the detection position information in chronological order, and the movement line information obtaining unit 25 generates an integrated movement line formed of the determined movement line and the undetermined movement line integrated together.

Thereby, in the state shown in part (A) in FIG. 3, the integrated movement line formed by integrating the determined movement line and the undetermined movement line is displayed to extend to the vicinity of the person shown in the displayed image, as shown in part (A) in FIG. 5. And, when the state shown in part (B) in FIG. 3 is encountered, the section represented by the undetermined movement line in part (A) in FIG. 5 is replaced with an updated (or newly generated) part of the determined movement line as shown in part (B) in FIG. 5. Thus, in the present embodiment, the movement line is displayed to follow the person, and therefore, it is possible to avoid causing the user to feel a sense of incongruity and allow the user to grasp the moving state of the person properly, thereby improving the efficiency of the monitoring work.

It is to be noted that the determined movement line generation process is affected by an extent of erroneous detection made in the moving object detection process, and thus, the length of the undetermined movement line varies depending on the number of erroneous detections made in the moving object detection process. However, regardless of the state of the determined movement line generation process, the integrated movement line formed of the determined movement line and the provisional movement line integrated together is always displayed to extend to the vicinity of the person (moving object) shown in the displayed image. Further, since it also requires certain time to perform the moving object detection process, the end point of the undetermined movement line, namely, the latest detection position may not be positioned exactly on the person's image shown in the displayed image. However, since the moving object detection process does not require much time, no significant difference would be caused between the position of the person shown in the screen image and the latest detection position of the person, and the undetermined movement line is displayed to extend to the vicinity of the person's image shown in the displayed image.

Further, in the present embodiment, the undetermined movement line formed by connecting the detection positions in chronological order is displayed as the provisional movement line that interpolates the undetermined section between the latest detection position and the end point of the determined movement line. Since the undetermined movement line includes the noise due to erroneous detection made in the moving object detection process, the undetermined movement line may deviate from the actual movement path of the person. However, the undetermined movement line substantially matches the actual movement path of the person, and thus, significantly contributes to grasping the moving state of the person properly.

Further, in the present embodiment, in response to the input operations performed by the user to designate the display method of the determined movement line and the provisional movement line, the setting unit 27 performs a process of setting the display method to that designated by the user, and the movement line information obtaining unit 25 generates the display information of the movement line in accordance with the display method set thereby. Thus, it is possible for the user to freely set the display method of the determined movement line and the provisional movement line as necessary, whereby the user convenience is improved.

Figure 6:
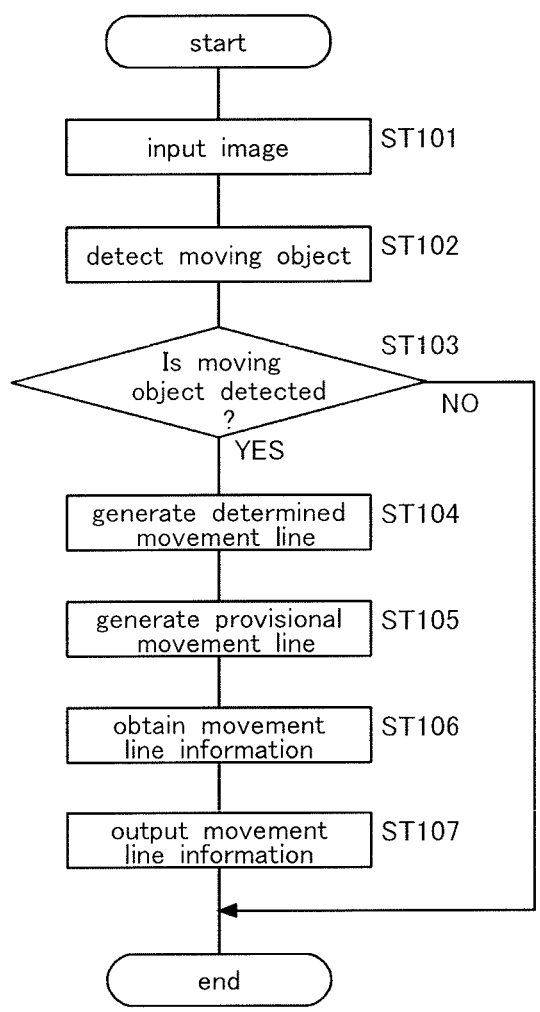
FIG. 6 is a flowchart showing a process performed by the moving object tracking device 4.

Next, a description will be given of the process performed by the moving object tracking device 4 shown in FIG. 2. FIG. 6 is a flowchart showing the process performed by the moving object tracking device 4.

In the moving object tracking device 4, when an image (frame) output from the camera 1 is input into the image input unit 21 (ST101), the moving object detection unit 22 performs a process of detecting a person(s) from the image (ST102). Then, if a person is detected from the image (YES in ST103), the determined movement line generation unit 23 performs a process of generating a determined movement line based on the moving object detection information (ST104). Further, the provisional movement line generation unit 24 performs a process of generating an undetermined movement line based on the moving object detection information (ST105). Subsequently, the movement line information obtaining unit 25 performs a process of obtaining movement line information relating to an integrated movement line formed by integrating the determined movement line and the undetermined movement line (ST106), and the movement line information generated by the movement line information obtaining unit 25 is output from the movement line output unit 26 (ST107).

On the other hand, it no person is detected from the images (NO in ST103), the processes of generating the determined movement line, generating the provisional movement line, obtaining the movement line information and outputting the movement line information (ST104 to ST107) are not performed, and the control flow proceeds to processing of the next image (frame).

Figure 7:
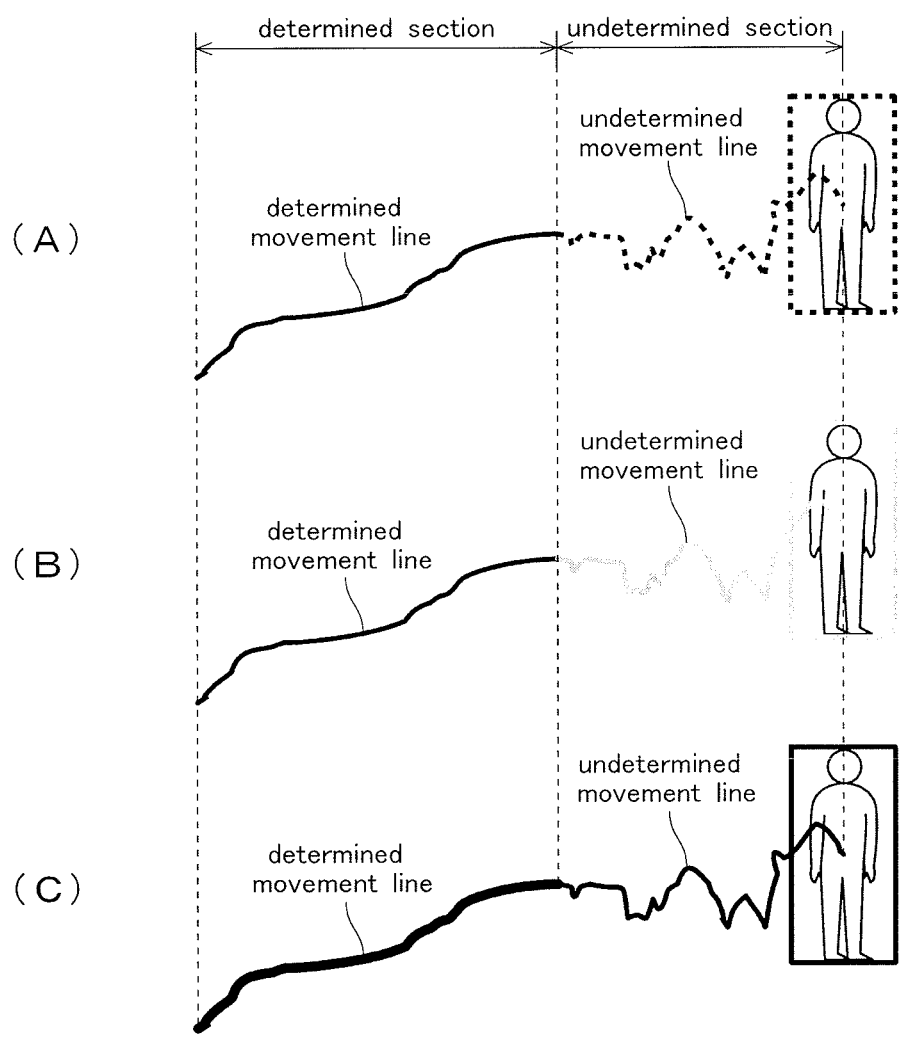
FIGS. 7A-C are explanatory diagrams for explaining exemplary methods of displaying the movement line.
Figure 8:
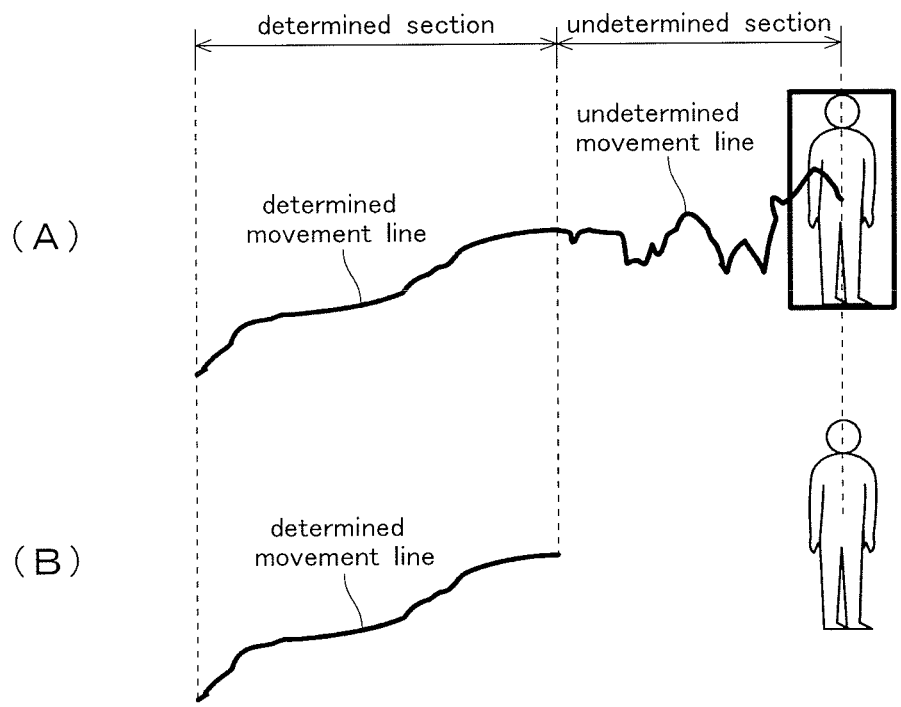
FIGS. 8A and 8B are explanatory diagrams for explaining an exemplary method of displaying the movement line.
Figure 9:
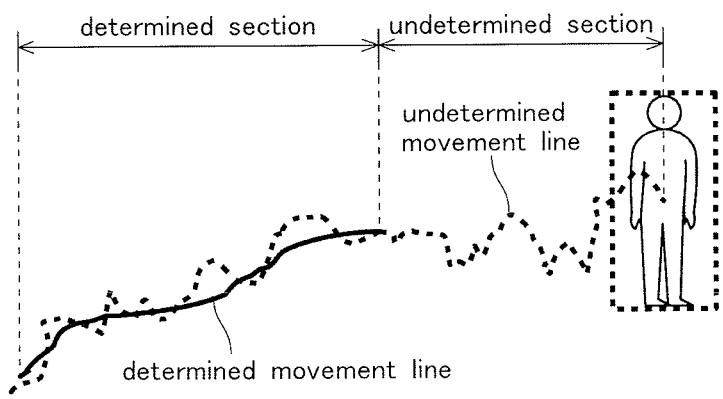
FIG. 9 is an explanatory diagram for explaining an exemplary method of displaying the movement line.

Next, a description will be given of the method of displaying the movement line shown in the screen displayed on the monitor 7 shown in FIG. 2. FIG. 7, FIG. 8 and FIG. 9 are explanatory diagrams for explaining exemplary methods of displaying the movement line.

In the example shown in part (A) in FIG. 7, the determined movement line and the undetermined movement line are drawn by different types of lines. Specifically, in this example, the determined movement line is drawn by a solid line while the undetermined movement line is drawn by a broken line. It is to be noted that the determined movement line and the undetermined movement line may be drawn by lines other than the solid line and the broken line, e.g., a dotted line, a long and short dashed line, a long and double-short dashed line, etc.

In the example shown in part (B) in FIG. 7, the determined movement line and the undetermined movement line are drawn with lines having different darkness (shade). Specifically, in this example, the determined movement line is drawn with a dark line while the undetermined movement line is drawn with a bright line. It is to be noted that the determined movement line and the undetermined movement line may be drawn with lines of different tints (hues). For example, it is possible to draw the determined movement line in red and to draw the undetermined movement line in blue.

Further, in the example shown in part (C) in FIG. 7, the determined movement line and the undetermined movement line are drawn with lines having different thickness. Specifically, in this example, the determined movement line is drawn with a thick line while the undetermined movement line is drawn with a thin line.

As described above, in the present embodiment, the determined movement line and the provisional movement line are displayed to be distinguishable from each other, and thus, it is possible to distinguish the determined movement line and the provisional movement line from each other visually. Particularly, when the provisional movement line is embodied by the undetermined movement line, distinguishing between the determined movement line and the undetermined movement line allows the user to grasp the situation in which the movement line is determined.

Particularly, in the present embodiment, the determined movement line and the provisional movement line are drawn with lines which are different in at least one of the line type, thickness, darkness and color, the determined movement line and the provisional movement line can be visually distinguished from each other easily.

On the other hand, in the example shown in FIG. 8, animation display that changes the state of display of the line periodically is performed on the undetermined movement line. Specifically, in the present embodiment, the undetermined movement line is displayed to blink. Namely, a first display state in which the undetermined movement line is displayed as shown in part (A) in FIG. 8 and a second display state in which the undetermined movement line is not displayed as shown in part (B) in FIG. 8 are repeated alternately. The determined movement line is always displayed.

As described above, in the present embodiment, animation display that changes the state of display of the line periodically is performed on the undetermined movement line, and thus, the determined movement line and the undetermined movement line can be displayed so as to be distinguishable from each other.

It is to be noted that the animation display may be performed on the determined movement line. Further, it is also possible to perform the animation display on each of the determined movement line and the provisional movement line. In such a case, different animation display should be performed for the determined movement line and the provisional movement line.

Further, in the examples shown in FIG. 7 and FIG. 8, the undetermined movement line was displayed only in the undetermined section. However, in the example shown in FIG. 9, the undetermined movement line is displayed in each of the determined section and the undetermined section, whereby both the determined movement line and the undetermined movement line are displayed in the determined section.

The methods of displaying the movement line shown in FIGS. 7 to 9 may be combined as appropriate. For example, it is possible to draw the solid line and the broken line respectively representing the determined movement line and the undetermined movement line as shown in part (A) in FIG. 7 such that the solid line and the broken line have different darkness and/or tints as in the example shown in part (B) in FIG. 7. Further, in the example shown in FIG. 8, the determined movement line and the undetermined movement line, on which the animation display is performed, were each drawn with a solid line, but the determined movement line and the undetermined movement line may be drawn with lines having different attributes such as line types as in the examples shown in FIG. 7.

Figure 10:
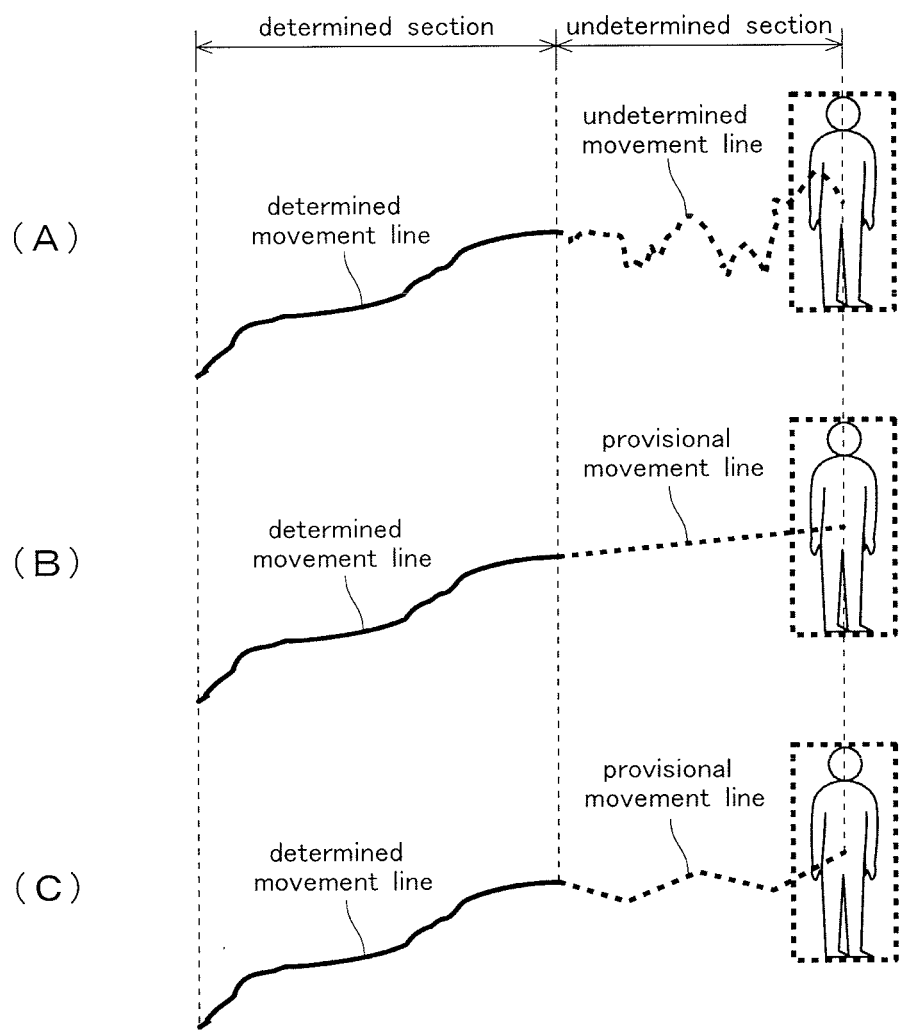
FIGS. 10A-C are explanatory diagrams for explaining other examples of the provisional movement line.

Next, a description will be given of other examples of the provisional movement line. FIG. 10 is an explanatory diagram for explaining other examples of the provisional movement line.

In the example shown in part (A) in FIG. 10, similarly to the examples shown in FIG. 7, the undetermined movement line formed by connecting the detection positions in chronological order is displayed as the provisional movement line in the undetermined section.

On the other hand, in the example shown in part (B) in FIG. 10, a straight line is displayed as the provisional movement line in the undetermined section. This straight line is drawn to connect the latest detection position obtained by the moving object detection unit 22 and the end point of the determined movement line. It is to be noted that a curved line may be displayed as the provisional movement line in the undetermined section. In this case, the curved line may be formed based on the curvature (degree of curving) of the part of the determined movement line near the end point thereof, etc.

Further, in the example shown in part (C) in FIG. 10, a "simplified" undetermined movement line is displayed as the provisional movement line. In contrast to the example shown in part (A) in FIG. 10, in which the undetermined movement line is drawn to connect all detection positions lined up in chronological order, in the example shown in part (C) in FIG. 10, the detection positions are partially omitted. Namely, the detection positions lined up in chronological order are thinned and a line formed of straight line segments connecting the thinned detection points is drawn as the provisional movement line.

It is preferred that the embodiments of the provisional movement line shown in FIG. 10 can be selected appropriately in accordance with the user need, as with the display methods of the determined movement line and the undetermined movement line shown in FIG. 7 to FIG. 9.

Figure 11:
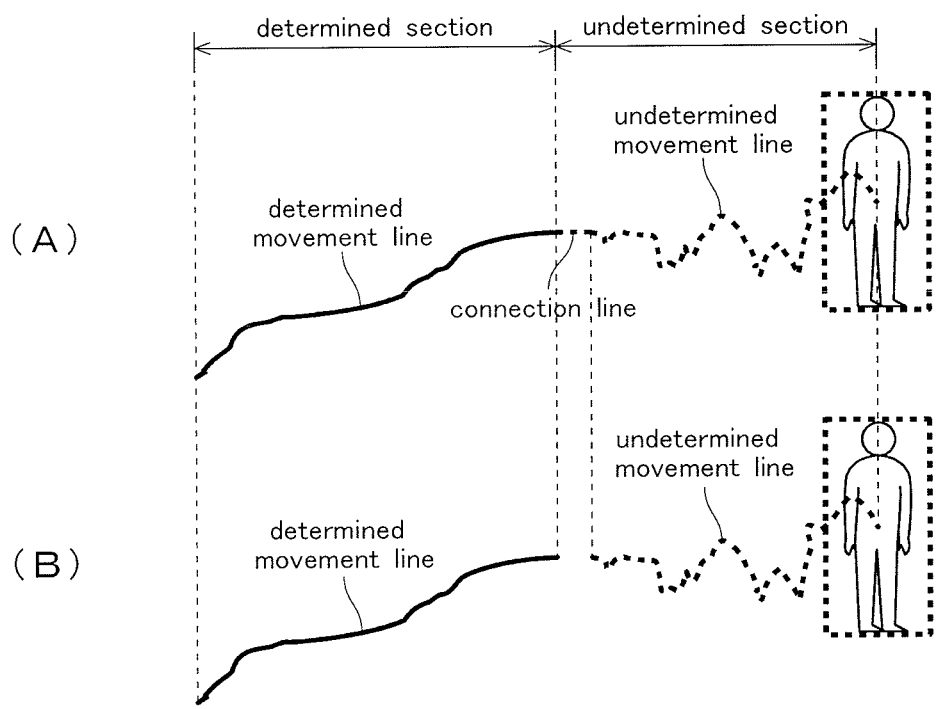
FIGS. 11A and 11B are explanatory diagrams for explaining methods of displaying an integrated movement line formed of a determined movement line and an undetermined movement line integrated together.

Next, a description will be given of methods of displaying the integrated movement line formed of the determined movement line and the undetermined movement line integrated together. FIG. 11 is an explanatory diagram for explaining methods of displaying the integrated movement line formed of the determined movement line and the undetermined movement line integrated together.

When the integrated movement line formed of the determined movement line and the undetermined movement line integrated together is displayed, the undetermined movement line is generated by connecting, in chronological order, the detection positions in the undetermined section, namely, a section after the time of the end point of the determined movement line, but the detection position at the time of the end point of the determined movement line (namely, the start point of the undetermined movement line) does not necessarily the same as the end point of the determined movement line. Under such circumstances, drawing methods shown in parts (A) and (B) in FIG. 11 may be adopted.

In the example shown in part (A) in FIG. 11, the end point of the determined movement line and the start point of the undetermined movement line are connected by a connection line. The connection line may be a straight line or a curved line. When the connection line consists of a curved line, the curved line may be formed based on the curvature (degree of curving) of the part of the determined movement line near the end point thereof and/or of the part of the undetermined movement line near the start point thereof, etc.

In the example shown in part (B) in FIG. 11, the end point of the determined movement line and the start point of the undetermined movement line are not connected, whereby a gap is formed between the determined movement line and the undetermined movement line. In this case, if the gap between the determined movement line and the undetermined movement line is large, the user may feel a sense of incongruity. However, normally, the difference between the end point of the determined movement line and the start point of the undetermined movement line at the same point of time is not significant and the gap between the determined movement line and the undetermined movement line is small, whereby the user substantially does not feel a sense of incongruity.

It is preferred that the drawing methods of the integrated movement line shown in FIG. 11 can be selected appropriately in accordance with the user need, as with the display methods of the determined movement line and the undetermined movement line shown in FIG. 7 to FIG. 9.

Figure 12:
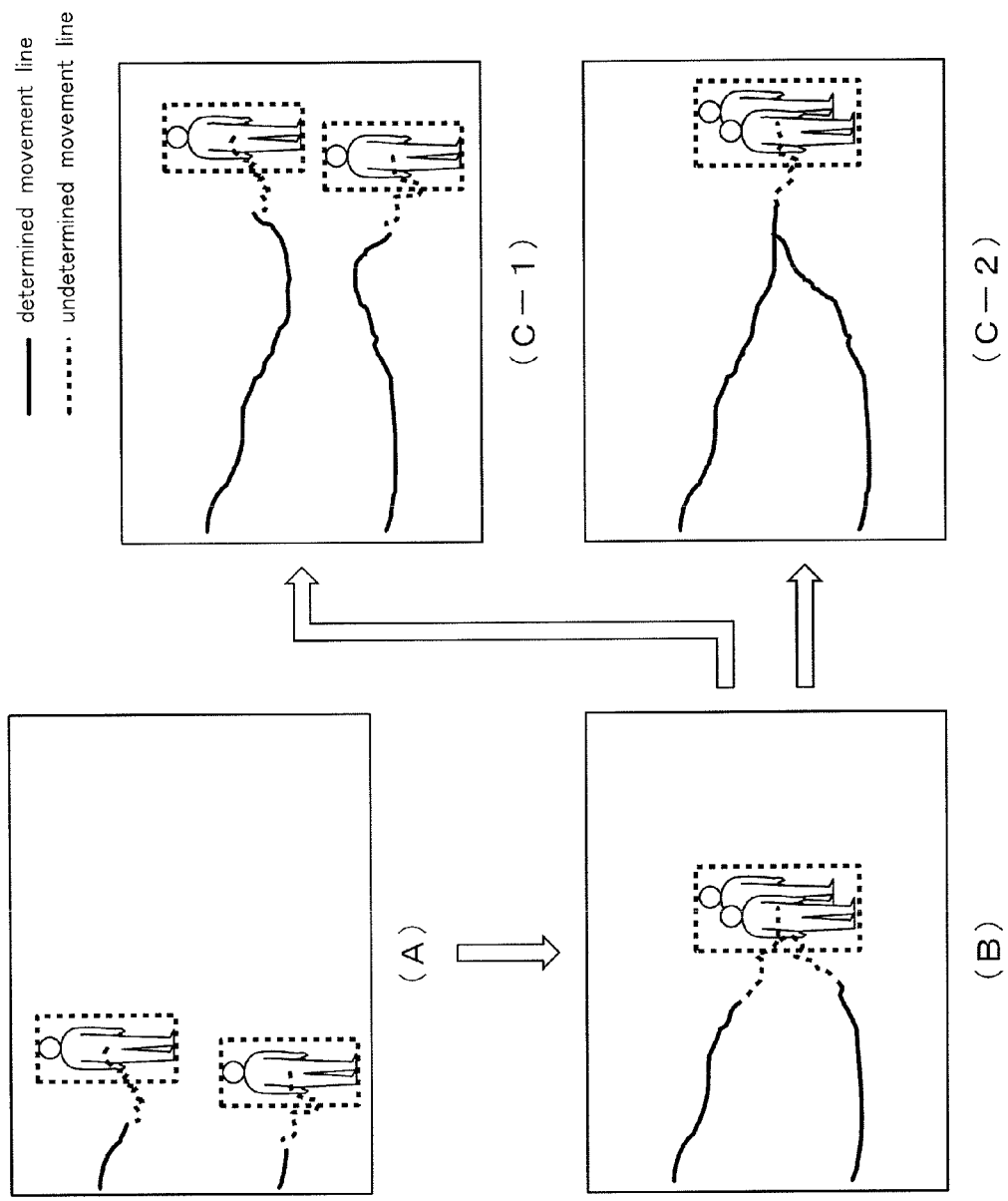

Next, a description will be given of a state of display of movement lines in a case where multiple persons are detected. FIG. 12 is an explanatory diagram for explaining states of display of movement lines in a case where multiple persons are detected. Here, a case where there are two persons detected will be described, but the present invention can be similarly applied to a case where more than two persons are detected.

First, when two persons are detected as shown in part (A) in FIG. 12, a determined movement line and an undetermined movement line are displayed for each of the two persons, as with the case when a single person is detected. Then, as shown in part (B) in FIG. 12, when two persons approach each other, the determined movement lines for the two persons are displayed separately from each other but the undetermined movement lines merges such that a single undetermined line is displayed for the two persons. Subsequently, if the two persons move away from each other as shown in part (C-1) in FIG. 12, the determined movement line and the undetermined movement line are displayed for each of the two persons.

On the other hand, if, from the state shown in part (B) in FIG. 12, the two persons move while keeping a short distance from each other as shown in part (C-2) in FIG. 12, the two determined movement lines that were displayed for the respective persons merge into one, as with the undetermined movement line.

As described above, in the present embodiment, even when there are multiple persons detected, the movement line is displayed for each person, whereby it is possible to grasp the moving state of each person. Particularly, in the present embodiment, the movement line is displayed to extend to the latest detection position of each person, and thus, it is possible to avoid associating each movement line with a wrong person. This also contributes to grasping the moving state of each person correctly.

In the foregoing, the present invention has been described in terms of concrete embodiments thereof. However, these embodiments are provided for illustrative purposes and the present invention is not limited by the embodiments. It is also to be noted that not all of the structural elements of the moving object tracking device, the moving object tracking system and the moving object tracking method as shown in the embodiments of the present invention are not necessarily indispensable, and they may be selectively used as appropriate without departing from the spirit of the present invention.

For instance, in the foregoing embodiment, a description was made of an example in which the present invention was applied to a retail store such as a supermarket. However, the present invention may be applied to a commercial establishment other than a retail store, such as a restaurant, which can be a casual dining restaurant, etc. Further, the present invention may be applied to a facility other than a commercial establishment, such as a plants, airport, railway, expressway, public facility, electric power facility, etc. where a wide area monitoring system may be adopted.

Further, in the foregoing embodiment, a description was given of an example in which the moving objects to be tracked were persons. However, the present invention may be used to track the moving objects other than persons, such as vehicles which may include cars, bicycles, etc.

Further, in the foregoing embodiment, the provisional movement line (undetermined movement line) was generated based on the latest detection position obtained by the moving object detection unit 22. However, it is not necessarily required to generate the provisional movement line based on the latest detection position, and the provisional movement line may be generated based on a detection position temporally close to the latest detection position.

Further, in the foregoing embodiment, the moving object tracking device 4 was provided separately from the camera 1, but a part or the entirety of the function of the moving object tracking device 4 may be incorporated into the camera 1 to constitute an imaging device having a moving object tracking function. Further, to increase the processing speed, a part of the functions of the moving object tracking device 4, such as those of the determined movement line generation unit 23 and the movement line information obtaining unit 25, may be transferred to the PC 3. It is also possible to incorporate the functions of the PC 3 into the moving object tracking device 4 or to incorporate the functions of the moving object tracking device 4 and the PC 3 into the recorder 2. In such structures, the PC 3 becomes unnecessary.

Further, in the example shown in FIG. 2, the display method setting unit 27 was provided to the moving object tracking device 4, but the display method setting unit 27 may be provided to the PC 3. In this case, the display method for each of the determined movement line and the undetermined movement line output from the movement line output unit 26 can be selected on the PC 3 side.

Further, in the foregoing embodiment, the all processes in the moving object tracking process were performed by a device set up at the store, but these necessary processes may be performed by the PC 11 set up at the management office or a cloud computer 12 forming a cloud computing system, as shown in FIG. 1. Further, these necessary processes may be performed by cooperation of multiple information processing devices, in which case, the multiple information processing devices are configured to be able to communicate or share information with each other via a communication medium such as an IP network or LAN. Thereby, the multiple information processing devices jointly executing the necessary processes constitute a moving object tracking system.

In this case, it is preferred that the device set up at the store be configured to perform at least the moving object detection process. In such a structure, since the information obtained by the moving object detection process has a small amount of data, even if the remaining processes are performed by an information processing device set up at a place other than the store, such as the PC 11 disposed at the management office, the communication load can be small, and thus, it is easy to operate the system in the form of a wide area network.

It may be also preferred that the cloud computer 12 be configured to perform at least the determined movement line generation process. In such a structure, although the determined movement line generation process requires a large amount of computation, the process is achieved by the information processing device constituting a cloud computing system, and therefore, it is not necessary to prepare a high-speed information processing device on the user side, namely at the store or the like. Further, since the remaining processes require a small amount of computation, the remaining processes can be performed as extended functions of an information processing device set up at the store to serve as a sales information management device, and this can reduce the cost born by the user.

It is also possible to make a configuration such that the cloud computer 12 performs the entirety or a part of the necessary processes or the movement line information obtained by the moving object tracking process is transmitted to the cloud computer 12. Such a structure makes it possible to view the tracking status of the moving object(s) on a mobile terminal such as a smartphone 13 in addition to the PC 3 set up at the store and the PC 11 set up at the management office, and this allows a user to view the tracking status not only at the store or the management office but also at any other place, such as a place the user is visiting on business.

Further, in the foregoing embodiment, a monitoring screen including one or more movement lines superimposed on the real-time image is displayed on the monitor 7 of the PC 3 set up at the store, but a display device for displaying the monitoring screen may be provided separately from the PC 3. For example, it is possible to use the PC 11 disposed at the management office or the smartphone 13 described above as a display device for displaying the monitoring screen. Besides, it is also possible to add the function of the display device for displaying the monitoring screen to a sales information management device disposed at the store.

The moving object tracking device, moving object tracking system and moving object tracking method according to the present invention are able to, when a movement line of a moving object is displayed superimposed on the real-time image of a monitored area, prevent the displayed movement line from causing a user to feel a sense of incongruity and allow the user to properly grasp the moving state of the moving object, and thus, are useful as a moving object tracking device, a moving object tracking system and a moving object tracking method for, to allow a display device to display a screen including a movement line of a moving object superimposed on the real-time image of a monitored area, obtaining movement line information based on detection position information obtained by detecting the moving object from images of the monitored area.

The invention claimed is:

1. A moving object tracking device, for generating a screen in which a movement line indicating a movement path of a moving object is superimposed on a real-time image of a monitored area, the moving object tracking device comprising:
    a processor; and
    a memory storing instructions,
    wherein the processor, when performing the instructions stored in the memory, comprises:
    a moving object detector that detects the moving object from images of the monitored area and outputs detection position information of the moving object;
    a first movement line generator that removes erroneous detection information included in the detection position information by use of a smoothing algorithm and generates a determined movement line optimized as the movement path of the moving object based on the detection position information having the erroneous detection information removed;
    a second movement line generator that generates a provisional movement line interpolating an undetermined section between a substantially latest detection position of the moving object indicated by the detection position information and an end point of the determined movement line; and
    a movement line information obtainer that obtains movement line information relating to an integrated movement line comprising the determined movement line and the provisional movement line integrated together; and
    a screen generator that generates, based on the movement line information, the screen in which the movement line is superimposed on the real-time image of the monitored area, such that both the determined movement line and the provisional movement line are included together in the screen before the end of the determined movement line reaches the latest detection position of the moving object, wherein an end of the provisional line substantially matches the latest detection position of the moving object,
    wherein the second movement line generator generates, as the provisional movement line, an undetermined movement line connecting the detection positions indicated by the detection position information in chronological order, without use of the smoothing algorithm.

2. The moving object tracking device according to claim 1, wherein when the moving object detector detects multiple moving objects from the images, the movement line information obtainer obtains the movement line information for each of the moving objects.

3. The moving object tracking device according to claim 1, wherein the movement line information includes display information for displaying the determined movement line and the provisional movement line in a manner so as to be distinguishable from each other.

4. The moving object tracking device according to claim 3, wherein the determined movement line and the provisional movement line are lines which are different from each other in at least one of line type, thickness, darkness and color.

5. The moving object tracking device according to claim 4, wherein one of the determined movement line and the provisional movement line is a solid line and the other is a broken line.

6. The moving object tracking device according to claim 3, wherein animation display is performed on at least one of the determined movement line and the provisional movement line so as to periodically change a display state of the line.

7. The moving object tracking device according to claim 3, further comprising a display method setter that, in accordance with an input operation performed by a user to designate a display method of the determined movement line and the provisional movement line, sets a display method to the display method designated by the user,
    wherein the display information is generated in accordance with the display method set by the display method setter.

8. A moving object tracking system allowing a display to display a screen in which a movement line indicating a movement path of a moving object is superimposed on a real-time image of a monitored area, obtaining movement line information based on detection position information obtained by detecting the moving object from images of the monitored area, the system comprising:
    a camera that captures images of the monitored area;
    a plurality of information processors; and
    the display that displays a screen in which the movement line is superimposed on the real-time image of the monitored area,
    wherein the plurality of information processors jointly comprise:
    a moving object detector that detects the moving object from the images of the monitored area and outputs the detection position information of the moving object;
    a first movement line generator that removes erroneous detection information included in the detection position information by use of a smoothing algorithm and generates a determined movement line optimized as the movement path of the moving object based on the detection position information having the erroneous detection information removed;
    a second movement line generator that generates a provisional movement line interpolating an undetermined section between a substantially latest detection position of the moving object indicated by the detection position information and an end point of the determined movement line;
    a movement line information obtainer that obtains movement line information relating to an integrated movement line comprising the determined movement line and the provisional movement line integrated together; and
    a screen generator that generates, based on the movement line information, the screen in which the movement line is superimposed on the real-time image of the monitored area, such that both the determined movement line and the provisional movement line are included together in the screen before the end of the determined movement line reaches the latest detection position of the moving object, wherein an end of the provisional line substantially matches the latest detection position of the moving object, wherein the second movement line generator generates, as the provisional movement line, an undetermined movement line connecting the detection positions indicated by the detection position information in chronological order, without use of the smoothing algorithm.

9. A moving object tracking method for generating a screen in which a movement line indicating a movement path of a moving object is superimposed on a real-time image of a monitored area, the method comprising:

detecting the moving object from images of the monitored area and outputting the detection position information of the moving object;

removing erroneous detection information included in the detection position information by use of a smoothing algorithm and generating a determined movement line optimized as the movement path of the moving object based on the detection position information having the erroneous detection information removed;

generating a provisional movement line interpolating an undetermined section between a substantially latest detection position of the moving object indicated by the detection position information and an end point of the determined movement line; and obtaining movement line information relating to an integrated movement line comprising the determined movement line and the provisional movement line integrated together, generating, based on the movement line information, the screen in which the movement line is superimposed on the real-time image of the monitored area, such that both the determined movement line and the provisional movement line are included together in the screen before the end of the determined movement line reaches the latest detection position of the moving object, wherein an end of the provisional line substantially matches the latest detection position of the moving object, wherein the generating the provisional line generates, as the provisional movement line, an undetermined movement line connecting the detection positions indicated by the detection position information in chronological order, without use of the smoothing algorithm, wherein at least one of the detecting the moving object, the removing erroneous detection information included in the detection position information and generating a determined movement line, the generating a provisional movement line, the obtaining movement line information and the generating the screen, is performed by a processor.

* * * * *